(12) United States Patent
Cai et al.

(10) Patent No.: US 12,484,873 B2
(45) Date of Patent: Dec. 2, 2025

(54) METHOD FOR DOSE CONTROL

(71) Applicant: Siemens Healthineers AG, Forchheim (DE)

(72) Inventors: Xiaoyun Cai, Erlangen (DE); Bernhard Geiger, Buckenhof (DE)

(73) Assignee: Siemens Healthineers AG, Forchheim (DE)

( * ) Notice: Subject to any disclaimer, the term of this patent is extended or adjusted under 35 U.S.C. 154(b) by 0 days.

(21) Appl. No.: 19/017,866

(22) Filed: Jan. 13, 2025

(65) Prior Publication Data

US 2025/0228516 A1    Jul. 17, 2025

(30) Foreign Application Priority Data

Jan. 15, 2024    (EP) .................................... 24151811

(51) Int. Cl.
*A61B 6/00*    (2024.01)

(52) U.S. Cl.
CPC .................................... *A61B 6/542* (2013.01)

(58) Field of Classification Search
CPC ...................................................... A61B 6/542
See application file for complete search history.

(56) References Cited

U.S. PATENT DOCUMENTS

| 2013/0077744 | A1  | 3/2013 | Kamiya |
| 2015/0139398 | A1* | 5/2015 | Tajima .................... G01T 1/026 378/62 |
| 2022/0249039 | A1  | 8/2022 | Hayashida |

OTHER PUBLICATIONS

Extended European Search Report for European Application No. 24151811.7 mailed Jul. 17, 2024.

* cited by examiner

*Primary Examiner* — Courtney D Thomas
(74) *Attorney, Agent, or Firm* — Harness, Dickey & Pierce, P.L.C.

(57) ABSTRACT

One or more example embodiments relates to a computer-implemented method for dose control with an automatic exposure control. The method comprises receiving a first time-course, receiving a second time-course, and receiving a cut-off dose. The method comprises determining a first weight, determining a second weight, multiplying a latest value of the first time-course with the first weight, wherein a first weighted accumulated dose is determined and multiplying a latest value of the second time-course with the second weight, wherein a second weighted accumulated dose is determined. The method comprises adding the first and the second weighted accumulated dose, wherein a weighted overall applied dose is determined, comparing the weighted overall applied dose with the cut-off dose, and providing a result of the comparison.

20 Claims, 7 Drawing Sheets

METHOD FOR DOSE CONTROL

CROSS-REFERENCE TO RELATED APPLICATION(S)

The present application claims priority under 35 U.S.C. § 119 to European Patent Application No. 24151811.7, filed Jan. 15, 2024, the entire contents of which is incorporated herein by reference.

FIELD

One or more example embodiments relates to a method and a system for dose control with an automatic exposure control.

RELATED ART

In x-ray imaging it is known in the art to use an automatic exposure control (acronym: AEC) for measuring and controlling an applied dose.

During the imaging process a patient is positioned between a radiation source and a detector. The source is configured for emitting radiation, in particular x-rays. The detector is configured for detecting the radiation which passed the patient. Like this, in particular, a radiography image of the patient or at least of a part of the patient can be acquired.

With the AEC the accumulated dose applied to the patient can be measured. For that purpose, the AEC is in particular placed behind the patient and in front of the detector. The measured accumulated dose is compared to a predetermined cut-off dose. As soon as the measured accumulated dose reaches the cut-off dose, the radiation can be stopped to avoid an over exposure of the patient.

There are two types of AECs used in medical imaging procedures: ionization AECs and solid-state AECs.

A solid-state AEC comprises a number of sub-chambers. With each of the sub-chambers an accumulated dose can be measured. Nowadays, the measured dose of each sub-chamber are summed up and this summed accumulated dose is compared to the cut-off dose.

It is known that "dense" materials like e.g., bone attenuate the radiation more than e.g., tissue. Thus, the dose measured by a sub-chamber which is placed behind a dense material is lower than the dose measured by a sub-chamber placed behind a less attenuating material like tissue or free-field. Therefore, sub-chambers which are placed behind such a dense material contribute less to the summed accumulated dose than sub-chambers which measure the accumulated behind e.g., tissue or free field.

In the following "high" and "low" attenuation is meant relative to the attenuation of the surrounding material and/or other material imaged.

In order to achieve a high image quality even within areas of dense materials, it is necessary that the patient is positioned perfectly in front of the AEC. It is necessary that all used sub-chambers are covered by the structure of interest if the structure of interest comprises a high attenuating material like bone. In particular in orthopedic examinations bone is typically the structure of interest.

SUMMARY

For positioning the patient perfectly in front of the AEC great experience is useful.

Therefore, it happens, that a patient is positioned less optimal and not all sub-chambers contributing to the summed accumulated dose are covered by the dense material of interest. Alternatively, it can happen, that a patient is too small and it is even not possible that all contributing sub-chambers are covered by the structure of interest. This in particular happens if the patient is a child.

As the measured dose behind tissue or behind free-field raises faster than the dose behind e.g., bone, by just adding the measured accumulated dose of all sub-chambers, the cut-off dose might be reached too fast and the radiation is stopped too early. This leads to noisy and grainy radiography images because the acquired radiation behind e.g., the bone is too low for a high-quality radiography image.

One or more example embodiments provides a method to ensure a high image quality even if a patient is not perfectly positioned in front of an AEC.

BRIEF DESCRIPTION OF THE DRAWINGS

Other objects and features will become apparent from the following detailed descriptions considered in conjunction with the accompanying drawings. It is to be understood, however, that the drawings are designed solely for the purposes of illustration and not as a definition of the limits of the invention.

DETAILED DESCRIPTION

Figure 1:
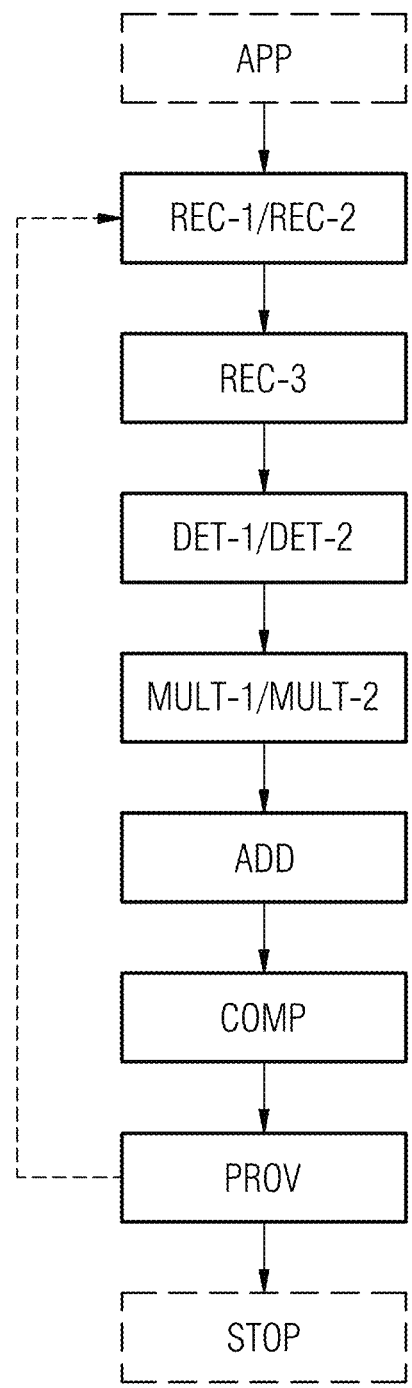
FIG. 1 displays a schematic flow chart of a first embodiment of the method for dose control, FIG. 2 displays a solid-state AEC comprising sub-chambers as known in the art, FIG. 3 displays a solid-state AEC comprising sub-chambers wherein some of the sub-chambers are covered by bone, FIG. 4 displays a flow chart of a second embodiment of a method for dose control, FIG. 5 displays a first embodiment of an AEC, FIG. 6 displays a second embodiment of an AEC, and FIG. 7 displays a system.

In the following one or more example embodiments is described with respect to the claimed systems as well as with respect to the claimed methods. Features, advantages, or alternative embodiments herein can be assigned to the other claimed objects and vice versa. In other words, claims for the systems can be improved with features described or claimed in the context of the methods. In this case, the functional features of the method are embodied by objective units of the system.

Independent of the grammatical term usage, individuals with male, female or other gender identities are included within the term.

One or more example embodiments relates to a computer-implemented method for dose control with an automatic exposure control (acronym: AEC). Therein the AEC comprises at least a first and a second sub-chamber. The method comprises a step of receiving a first time-course of a first accumulated dose from the first sub-chamber. The method further comprises a step of receiving a second time-course of a second accumulated dose from the second sub-chamber. The method comprises a step of receiving a predetermined cut-off dose. The method comprises a step of determining a first weight based on the first time-course. The method further comprises a step of determining a second weight based on the second time-course. The method comprises a step of multiplying a latest value of the first time-course with the first weight, wherein a first weighted accumulated dose is determined. The method comprises a step of multiplying a latest value of the second time-course with the second weight, wherein a second weighted accumulated dose is determined. The method comprises a step of adding the first and the second weighted accumulated dose, wherein a weighted overall applied dose is determined. The method comprises a step of comparing the weighted overall applied dose with the predetermined cut-off dose. The method comprises a step of providing the result of the comparison.

The AEC is in particular a solid-state AEC. With other words, the AEC comprises at least two (the first and the second) sub-chambers which can measure a dose of a radiation hitting the sub-chambers based on semi-conductor technique.

In particular, the AEC can comprise more than two sub-chambers. In this case the steps of the method are performed for all sub-chambers similarly.

In particular the sub-chambers of the AEC can be grouped. In this case the sub-chambers of one group have to be used together for the described method. In particular, the sub-chambers of more than one group can be used together for the described method.

In the step of receiving the first time-course, the first time-course of the first accumulated dose is received from the first sub-chamber. With other words, the first time-course is measured and provided by the first sub-chamber. The first time-course provides an information about the increase of the first accumulated dose over time. In particular, the first time-course can comprise values for the first accumulated dose which are measured each millisecond or each 10 milliseconds or each 100 milliseconds or each second.

In the step of receiving the second time-course, the second time-course of the second accumulated dose is received from the second sub-chamber. With other words, the second time-course is measured and provided by the second sub-chamber. The second time-course provides an information about the increase of the second accumulated dose over time. In particular, the second time-course can comprise values for the second accumulated dose which are measured each millisecond or each 10 milliseconds or each 100 milliseconds or each second.

In the step of receiving the predetermined cut-off dose, the predetermined cut-off dose is received in particular via a user input or from a database. The predetermined cut-off dose describes the value which an accumulated dose applied to a patient should not exceed. The cut-off dose can be based on official safety requirements. Alternatively, the cut-off dose can be system specific. With other words, the cut-off dose can be specific for the system which is used for the medical imaging process. The system in particular comprises the source, the detector and the AEC. In particular, the system-specific cut-off dose can be based on a value according to official safety requirements which is adapted to the specific system.

In the step of determining the first weight, the first weight is determined in dependence of the first time-course of the first accumulated dose. With other words, the first weight depends on how the first accumulated dose evolves over time.

In the step of determining the second weight, the second weight is determined in dependence of the second time-course of the second accumulated dose. With other words, the second weight depends on how the second accumulated dose evolves over time.

In the step of multiplying the latest value of the first time-course with the first weight, the first weighted accumulated dose is determined. As described above, the first time-course comprises a number of values describing the temporal change of the first accumulated dose, measured with the first sub-chamber. The latest value in this case is the temporally last value of the first time-course. With other words, the latest value describes the accumulated dose which was measured last. Therefore, the first weighted accumulated dose, describes the last measured value of the accumulated dose within the first sub-chamber which is weighted by the first weight.

In particular, all values of the first time-course can be multiplied with the first weight. In this case, a first weighted time-course is determined, the first weighted accumulated dose is in this case, the latest value of the first weighted time-course.

In the step of multiplying the latest value of the second time-course with the second weight, the second weighted accumulated dose is determined. As described above, the second time-course comprises a number of values describing the temporal change of the second accumulated dose, measured with the second sub-chamber. The latest value in this case is the temporally last value of the second time-course. With other words, the latest value describes the accumulated dose which was measured last. Therefore, the second weighted accumulated dose, describes the last measured value of the accumulated dose within the second sub-chamber which is weighted by the second weight.

In particular, all values of the second time-course can be multiplied with the second weight. In this case, a second weighted time-course is determined, the second weighted accumulated dose is in this case, the latest value of the second weighted time-course.

In particular, if the AEC comprises more than two sub-chambers and, in particular, more than two sub-chambers are used, the above-described steps are performed for each of the used sub-chambers.

In the step of adding the first and the second weighted accumulated dose, the weighted overall applied dose is determined. The weighted overall applied dose does not necessarily describe the dose which is actually applied to the patient.

If more than two sub-chambers were used, then the according weighted accumulated doses are also added to determine the weighted overall applied dose.

In the step of comparing the weighted overall applied dose with the predetermined cut-off dose, it is checked, whether the weighted overall applied dose already equals or exceeds the cut-off dose.

In the step of providing the result of the comparison, in particular, an information whether the weighted overall applied dose equals or exceeds the cut-off dose is provided. In particular, it can be provided via a user interface, e.g., a monitor and/or a flash light. In particular, it can be provided a warning as soon as the weighted overall applied dose equals or exceeds the cut-off dose. Alternatively or additionally, the result can be provided to a database or a computer system in order to further use the result for further decisions and/or to control the imaging system which is used in the medical imaging procedure.

The inventors recognized that by considering the time-course of the accumulated dose in each sub-chamber it can be ensured that sub-chambers which measure the dose behind a free-field or behind low absorbing material like tissue, only contribute to the weighted overall applied dose in accordance to the respective weight. The inventors recognized that like this, the influence of the measured accumulated dose of the different sub-chambers on the weighted overall applied dose can be controlled. The inventors recognized that in particular for increasing the image quality in areas of high absorbing materials, the weights can be determined such that the influence of the sub-chambers measuring the accumulated dose behind this high absorbing materials have a higher influence on the weighted overall applied dose than e.g., a measured accumulated dose of a sub-chamber which is located behind a less absorbing or even none absorbing material. Like this, the cut-off dose is reached later. Like this, it can be ensured, that a high enough dose is applied to achieve a high image quality in the region of interest even if this regions comprises high absorbing material. Like this a repeated imaging of the patient can be avoided as the necessary image quality can be achieved with the first acquisition. This on the one handside saves time, costs and is more sustainable, on the other handside, the dose applied to the patient is reduced, as acquiring a second medical image because the image quality of the first one is too low, leads to an even higher dose as if the dose of the first medical image is increased a bit.

According to one or more example embodiments the method comprises a step of applying a radiation to the first and second sub-chamber.

The radiation in particular is in the energy regime of x-rays, in particular of medically used x-rays. In particular, the radiation is in the energy regime of x-rays used for medical imaging.

The radiation is applied to the first and second sub-chamber. The radiation can pass the patient before it is applied to the first and second sub-chamber.

The first and second sub-chamber are configured to measure the accumulated dose which is caused by the applied radiation.

According to one or more example embodiments the method further comprises a step of stopping the radiation if based on the comparison the weighted overall applied dose equals and/or exceeds the predetermined cut-off dose.

In particular, in the step of providing the result, the result is provided such that the radiation is stopped in dependence of the result. In particular, the result is provided to the source, which emits the radiation.

The inventors recognized that in order to avoid an over exposure of the patient, the radiation can be stopped automatically in dependence of the result of the comparison. Like this, in case the cut-off dose is reached the radiation can be stopped and no more dose is applied to the patient. Nevertheless, as the contribution of the different sub-chambers to the weighted overall applied dose is controlled by the weights, it can be ensured that even if high absorbing materials like bones have to imaged, a high image quality can be achieved.

According to one or more example embodiments, the first time-course is characterized by a first gradient. Therein the first weight is determined based on the first gradient. Additionally or alternatively, the second time-course is characterized by a second gradient. Therein the second weight is determined based on the second gradient.

The first gradient describes the temporal increase of the first accumulated dose measured with the first sub-chamber. With other words, the first gradient describes the slope of the first time-course of the first accumulated dose.

The second gradient describes the temporal increase of the second accumulated dose measured with the second sub-chamber. With other words, the second gradient describes the slope of the second time-course of the second accumulated dose.

The first weight depends on the first gradient. With other words, the value of the first weight is related to respectively connected with the value of the first gradient.

The second weight depends on the second gradient. With other words, the value of the second weight is related to respectively connected with the value of the second gradient.

The inventors recognized, that behind a high absorbing respectively dense material like bone, the accumulated dose increases slower with the time as behind free-field or behind low absorbing material like tissue. Hence, the inventors recognized that the temporal increase of the accumulated dose, namely the gradient respectively slope of the time-course measured with a sub-chamber gives a hint on the material respectively the attenuating capacity of the material in front of the sub-chamber. The inventors recognized that like this in dependence of the medical question for which the medical image is acquired, the influence of the different accumulated doses on the weighted overall applied dose can be determined in dependence of the material which is placed in front of the respective sub-chamber. This is achieved by adapting the weights as described above.

According to one or more example embodiments, the first weight is anti-proportional to the first gradient and/or the second weight is anti-proportional to the second weight.

With other words, as larger the first gradient, as smaller is the first weight. Alternatively or additionally, as larger the second gradient, as smaller is the second weight.

Alternatively, the dependency respectively the relation needs not necessarily be continuously anti-proportional.

E.g., the first weight can be constant for a range of the first gradient. If the first gradient is outside the range, the first weight is adapted to the first gradient. If the first gradient is below this range the first weight is increased. If the first gradient is above this range, the first weight is decreased.

By analogy, e.g. the second weight can be constant for a range of the second gradient. If the second gradient is outside the range, the second weight is adapted to the second gradient. If the second gradient is below this range the second weight is increased. If the second gradient is above this range, the second weight is decreased.

The inventors recognized that an anti-proportional dependency between the weight and the gradient solves the above-mentioned problem. Like this, it can be ensured that the influence of an accumulated dose which is measured behind a high absorbing material is increased in comparison to an accumulated dose which is measured between a low absorbing material. Like this, it can be ensured, that by reaching the cut-off dose, the image quality of the high absorbing material is good enough for further medical decisions or diagnosis.

According to one or more example embodiments, the first weight is set to a first value if the first gradient is below a predetermined threshold and the first weight is set to a second value if the first gradient is above the predetermined threshold. Alternatively or additionally, the second weight is set to the first value if the second gradient is below the predetermined threshold and the second weight is set to the second value if the second gradient is above the predetermined threshold. Therein the first value is larger than the second value.

The predetermined threshold is set such that the accumulated dose measured behind a region of interest of the patient is more strongly weighted than other accumulated doses when the weighted overall applied dose is determined. In particular, the threshold can be set such that an accumulated dose measured behind e.g., bone is more heavily weighted than an accumulated dose measured behind e.g., tissue or measured in the free field.

The inventors recognized that above-described advantages can also be achieved by using a predetermined threshold and fixed values for determining the weights. In particular, this provides an easy method for determining the first and the second weight. In particular, like this, less computational resources are used. The threshold can easily be adapted to the material of interest respectively to the material of the region of interest.

According to one or more example embodiments the steps of the above-described method are repeated as long as the weighted overall accumulated dose equals and/or exceed the predetermined cut-off dose.

With other words, the above-described steps are continuously repeated, wherein the latest values of the first and the second time-course change. In particular, the latest values of the first and the second time-course increase.

As soon as the weighted overall applied dose reaches and/or exceeds the cut-off dose, a warning message can be provided. Alternatively or additionally, as described above, in this case, the radiation can be stopped.

The inventors recognized that by repeating the above-described steps of the method it is ensured that the current accumulated dose values are considered for determining the weighted overall applied dose. As the accumulated dose values increase over time, by repeating the steps of the method, it can be ensured, that always the current dose is considered and an overexposure of the patient can be avoided.

One or more example embodiments relates to an AEC comprising at least a first and a second sub-chamber. The AEC is configured for performing the method according to the above-described method.

The AEC is particular a solid-state AEC. The sub-chambers are configured for measuring a dose, in particular an accumulated dose, which is applied by radiation passing through the AEC's sub-chambers.

The AEC can in particular be used in a method as described above.

According to one or more example embodiments, the AEC comprises a number of sub-chambers which are distributed over an area which corresponds to an imaging area of a detector.

The detector is configured for detecting radiation and for acquiring the medical image. The detector is characterized by the imaging area in which the radiation can be detected.

The AEC is configured such that the sub-chambers are distributed over an area which corresponds to the size of the imaging area.

The inventors recognized that like that a more precise weighted overall applied dose can be determined, as the whole imaging area is considered. The inventors additionally recognized that like this, single sub-chambers which fall out of the range because they measure e.g., a free-field dose have less impact on the weighted overall applied dose as if the sub-chambers are only distributed over a smaller part of the imaging area. In particular, perfectly positioning a patient in front of the AEC's sub-chambers is more simplified, if the sub-chambers are distributed over the whole imaging area. Like this it can be ensured in a more secure way, that the regions of interest are positioned in front of at least one sub-chamber.

According to one or more example embodiments, the number of sub-chambers are equally distributed over the imaging area.

The inventors recognized that like this each detector respectively imaging area can be covered by a sub-chamber. Like this it can be ensured that the accumulated dose considers all possible areas which are imaged. This leads to an easier positioning of the patient, as the region of interest is always positioned in front of a sub-chamber as long it is positioned in front of the imaging area.

According to one or more example embodiments, the number of sub-chambers are sub-divided into groups. Therein sub-chambers comprised by one group can only be read out together.

With other words, the sub-chambers of one group can only be activated together. Several groups can be used together.

Nevertheless, it is still possible to read out accumulated dose values of each single sub-chamber.

One or more example embodiments relates to a system for dose control with an AEC. The AEC comprises at least a first and a second sub-chamber. The system comprises an interface and a computation unit, wherein the interface and/or the computation unit are configured for performing the following steps:

receiving a first time-course of a first accumulated dose from the first sub-chamber, receiving a second time-course of a second accumulated dose from the second sub-chamber, receiving a predetermined cut-off dose, determining a first weight based on the first time-course, determining a second weight based on the second time-course, multiplying a latest value of the first time-course with the first weight, thereby determining a first weighted accumulated dose, multiplying a latest value of the second time-course with the second weight, thereby determining a second weighted accumulated dose, adding the first and the second weighted accumulated dose, thereby determining a weighted overall applied dose, comparing the weighted overall applied dose with the predetermined cut-off dose, providing the result of the comparison.

In particular, the system can be configured to execute the previously described method for dose control with an AEC. The system is configured to execute this method and its aspects by the interface and the computation unit being configured to execute the corresponding method steps. In particular, the interface can comprise one or more sub-interfaces. In particular, the computation unit can comprise one or more computation sub-units.

One or more example embodiments relates to a computer program product with a computer program and a computer-readable medium. A mainly software-based implementation has the advantage that even previously used systems can be easily upgraded by a software update in order to work in the manner described. In addition to the computer program, such a computer program product can optionally include additional components such as documentation and/or additional components, as well as hardware components such as e.g., hardware keys (dongles etc.) for using the software.

One or more example embodiments relates to a computer program product comprising program elements directly loadable into a memory unit of a first providing system, which induces the system to execute the method according to the claimed method and its aspects when the program elements are executed by the system.

One or more example embodiments relates to a computer-readable storage medium comprising program elements which are readable and executable by a system, to execute the claimed method and its aspects, when the program elements are executed by the system.

One or more example embodiments relates to a computer-readable storage medium, comprising a first trained function as claimed.

FIG. 1 displays a schematic flow chart of a first embodiment of the method for dose control.

In an optional step of applying APP a radiation, a radiation is applied to at least a first and a second sub-chamber of an automatic exposure control (acronym: AEC) 1. The radiation is emitted by a source. The radiation is in particular in the energy regime of x-rays. In particular, the radiation is in the energy regime used for medical imaging purposes, in particular for medical imaging.

The AEC 1 comprises at least the first and the second sub-chamber A, B. In particular, the AEC 1 can comprise more than two sub-chambers. The AEC 1 is in particular, placed in front of a detector 3. The detector 3 is configured for detecting the incoming radiation for acquiring a medical image.

Typically, the detector 3 is placed such that the radiation emitted by the source 4 first passes an area of a patient 2 which should be imaged then hits the detector 3. The AEC 1 is placed between the detector 3 and the patient 2 in order to detect the dose applied to the patient 2 by the radiation.

The patient 2 can be a human or an animal or an object.

In the steps of receiving REC-1 a first-time course TC1 of a first accumulated dose of the first sub-chamber A and of receiving a second time-course TC2 of a second accumulated dose of the second sub-chamber B, the first time-course A is provided by the first sub-chamber A and the second time-course TC2 is provided by the second sub-chamber B.

The first time-course TC1 describes how the first accumulated dose measured by the first sub-chamber A temporally evolves. In particular, the first time-course TC1 describes how fast the first accumulated dose increases. The first time-course TC1 comprises at least two data points which describe the first accumulated dose at two different points in time, measured by the first sub-chamber A. In particular, the first time-course TC1 can comprise more than two data points respectively data values. In particular, the first time-course TC1 can comprise data points respectively values measured by the first sub-chamber A e.g., each 10 ms, 100 ms or second.

The second time-course TC2 describes how the second accumulated dose measured by the second sub-chamber B temporally evolves. In particular, the second time-course TC2 describes how fast the second accumulated dose increases. The second time-course TC2 comprises at least two data points which describe the second accumulated dose at two different points in time, measured by the second sub-chamber B. In particular, the second time-course TC2 can comprise more than two data points respectively data values. In particular, the second time-course TC2 can comprise data points respectively values measured by the second sub-chamber B e.g., each 10 ms, 100 ms or second.

In the step of receiving REC-3 a predetermined cut-off dose COD the cut-off dose COD is received e.g., via a user interface and/or from a database. The cut-off dose COD can be manually predetermined and provided. Alternatively, the cut-off dose COD can be a standard dose provided by medical regulations. The cut-off dose COD can depend on the patient to be imaged. In particular, the cut-off dose COD for a child can be smaller than the cut-off dose COD for an adult. In particular, the cut-off dose COD can depend on the region to be imaged. In particular, the cut-off dose COD for imaging a knee can be smaller than the cut-off dose COD for imaging a chest. The cut-off dose COD provides a dose value which should maximally applied to the patient.

In the step of determining DET-1 the first weight W1, the first weight W1 is determined based on the first time-course TC1. In the step of determining DET-2 the second weight W2, the second weight W2 is determined based on the second time-course TC2. The first and the second weight W1, W2 are determined by a computation unit.

In particular, the first weight W1 depends on the temporal change, in particular, on the temporal increase of the first accumulated dose.

In particular, the second weight W2 depends on the temporal change, in particular, on the temporal increase of the second accumulated dose.

According to an embodiment of the invention, the first time-course TC1 is characterized by a first gradient. The first gradient describes the slope of the increase of the first accumulated dose. The first weight W1 is determined based on the first gradient.

Optionally, the first weight W1 is anti-proportional to the first gradient. This means, that as larger the first gradient, as smaller the first weight W1. In particular this dependency between the first gradient and the first weight W1 can be continuously. Alternatively, this dependency can be step-wise. With other words, within a range of values for the first gradient the first weight W1 can be constant. If the first gradient is below this range, the first weight W1 can be higher. If the first gradient is above this range, the first weight W1 can be lower.

Optionally the first weight W1 is set to a first value if the first gradient is below a predetermined threshold and the first weight W1 is set to a second value if the first gradient is above the predetermined threshold. Therein, the first value is larger than the second value. In particular, more than one threshold can be predetermined, defining a step-wise behavior of the first weight in dependence of the first gradient.

The predetermined threshold can depend on the patient to be imaged and/or on the area of the patient to be imaged. In particular, the predetermined threshold is set such that the material in the area to be imaged in particular in the region of interest, is depicted in the medical image in a sufficient high image quality. The predetermined threshold can either be set manually by an experienced user or it can be provided by a database, being a standard value.

According to an embodiment of the invention, the second time-course TC2 is characterized by a second gradient. The second gradient describes the slope of the increase of the second accumulated dose. The second weight W2 is determined based on the second gradient.

Optionally, the second weight W2 is anti-proportional to the second gradient. This means, that as larger the second gradient, as smaller the second weight W2. In particular this dependency between the second gradient and the second weight W2 can be continuously. Alternatively, this dependency can be step-wise. With other words, within a range of values for the second gradient the second weight W2 can be constant. If the second gradient is below this range, the second weight W2 can be higher. If the second gradient is above this range, the second weight W2 can be lower.

Optionally the second weight W2 is set to a first value if the second gradient is below the above-described predetermined threshold and the second weight W2 is set to a second value if the second gradient is above the predetermined threshold. Therein, the first value is larger than the second value. In particular, more than one threshold can be predetermined, defining a step-wise behavior of the second weight in dependence of the second gradient.

In a step of multiplying MULT-1 a latest value of the first time-course TC1 with the first weight W1, a first weighted accumulated dose is determined. The latest value of the first time-course TC1 is the value for the first accumulated dose measured last by the first sub-chamber A. In particular, all values of the first time-course TC1 can be multiplied with the first weight W1. In this case a first weighted time-course is determined. The latest respectively last value of the first weighted time-course corresponds to the first weighted accumulated dose.

In a step of multiplying MULT-1 a latest value of the second time-course TC2 with the second weight W2, a second weighted accumulated dose is determined. The latest value of the second time-course TC2 is the value for the second accumulated dose measured last by the second sub-chamber B. In particular, all values of the second time-course TC2 can be multiplied with the second weight W2. In this case a second weighted time-course is determined. The latest respectively last value of the second weighted time-course corresponds to the second weighted accumulated dose.

In a step of adding ADD the first and the second weighted accumulated doses a weighted overall applied dose WOAD is determined.

In a step of comparing COMP the weighted overall applied dose WOAD is compared with the predetermined cut-off dose COD. In particular, it is compared, whether the weighted overall applied dose WOAD equals and/or exceeds the predetermined cut-off dose COD.

In a step of providing PROV a result of the comparison, the result of the above-described comparison is provided.

In particular, a warning in dependence of the result can be provided. In particular, a user can be informed by the warning when the weighted overall applied dose WOAD equals and/or exceeds the cut-off dose COD. In this case, the warning can be provided e.g., via a flashlight and/or via a monitor and/or via an audio output.

Optionally, the result can be provided to the source emitting the radiation and/or to a controller of the source. The result can be used to stop STOP the radiation as soon as according to the result, the weighted overall applied dose WOAD equals and/or exceeds the predetermined cut-off dose COD.

Optionally the steps of the method can be repeated until during the step of comparing COMP it is recognized that the weighted overall applied dose WOAD equals and/or exceeds the cut-off dose COD. In this case in the steps of receiving REC-1 the first time-course TC1 and of receiving REC-2 the second time-course TC2, the first and the second time-course TC1, TC2 are updated. With other words, in these steps, a new value for the first and second accumulated dose is received. Like this, the latest values of the time-courses TC1, TC2 change and the comparison compares the current values. Like this, the increase of the first and the second accumulated doses can be considered and it can be recognized in time if the weighted overall applied dose WOAD equals and/or exceeds the predetermined cut-off dose COD.

Figure 2:
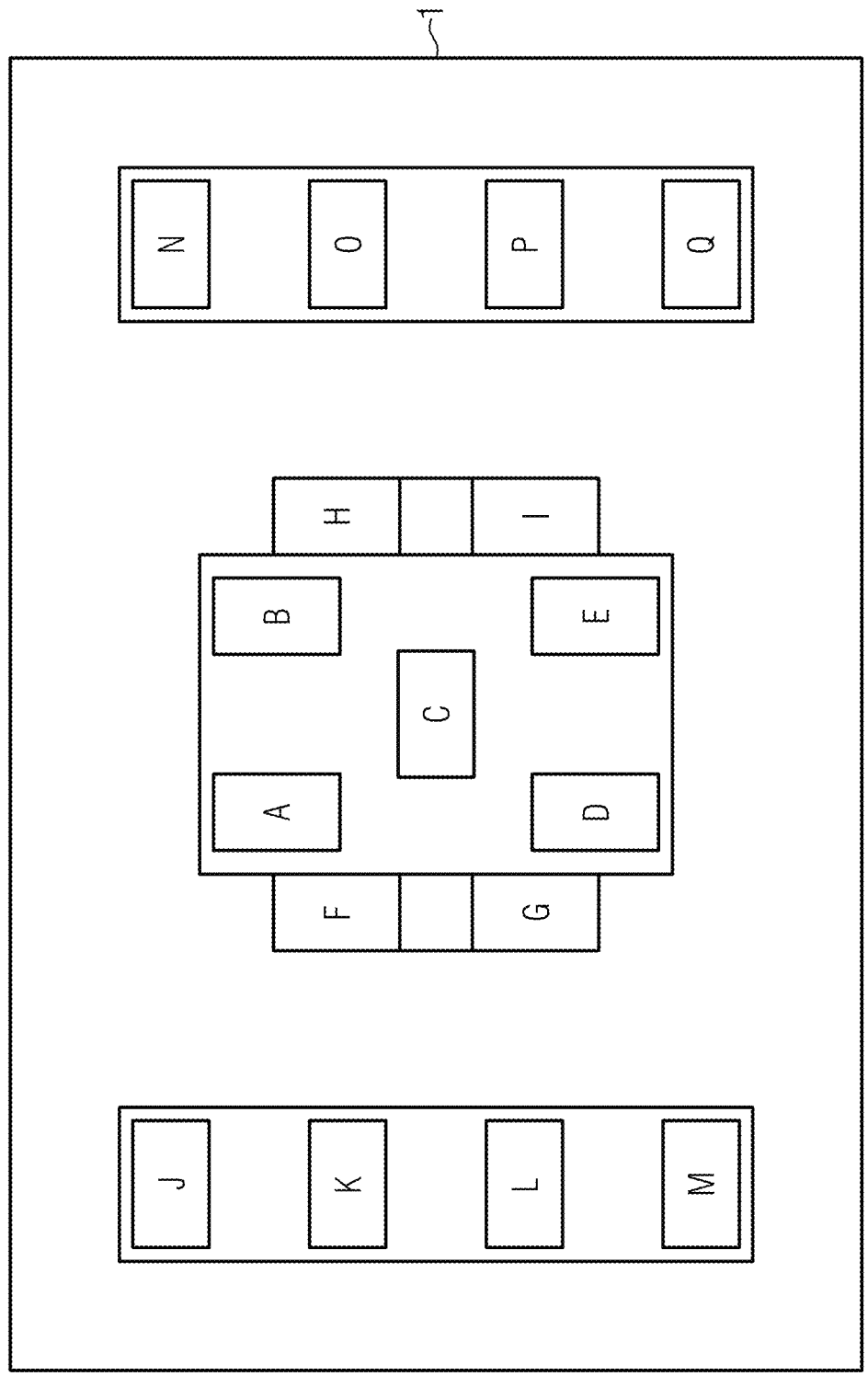

FIG. 2 displays a solid-state AEC 1 comprising sub-chambers A, B, C, D, E, F, G, H, I, J, K, L, M, N, O, P, Q as known in the art.

The depicted AEC 1 is an AEC 1 used in the art. The AEC 1 depicted comprises 17 sub-chambers A, . . . , Q.

The sub-chambers A, . . . , Q are grouped. In particular, sub-chambers A, B, C, D, E in the center form a first group. This group can be enlarged by further sub-chambers F, G, H, I. Sub-chambers J, K, L, M on the left form a second group and sub-chambers N, O, P, Q on the right form a third group.

Sub-chambers A, . . . , Q of one group can only be used together, while sub-chambers A, . . . , Q of other groups can be deactivated. With other words, the sub-chambers A, . . . , Q can only be activated and deactivated groupwise. E.g., a user can decide only to use respectively activate sub-chambers A, . . . , E of the first group to perform the above-described method. In particular, sub-chambers A, . . . , Q of more than one group can be used respectively activated together.

The AEC 1 is a solid-state AEC. This means that the radiation is measured by each single sub-chamber A, . . . , Q by a semi-conductor principle.

Figure 3:
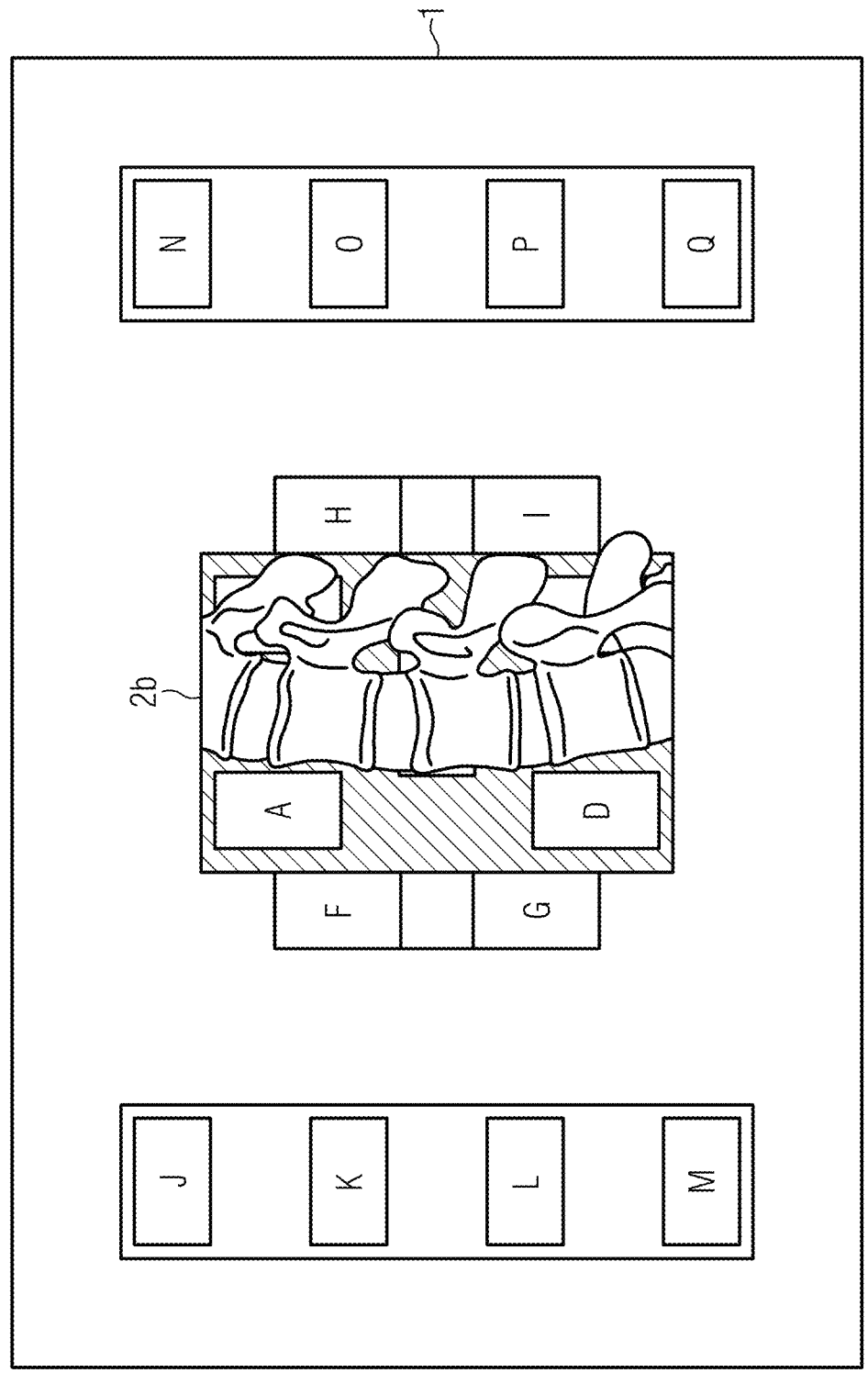

FIG. 3 displays a solid-state AEC 1 comprising sub-chambers A, . . . , Q wherein some of the sub-chambers A, . . . , Q are covered by bone 2b.

The AEC 1 displayed in FIG. 3 corresponds to the AEC 1 displayed in FIG. 2. In this embodiment the first group of sub-chambers A, . . . , E is chosen to be used respectively is activated. The patient 2 is positioned in front of this first group such that right sub-chambers B, C, E of the first group are covered by the bone of the spine, whereas left sub-chambers A, D are not covered or are only covered by surrounding tissue (not depicted).

This causes a faster increase of the measured accumulated dose in sub-chambers A, D not covered by the spine and a slower increase of the measured accumulated dose in the sub-chambers B, C, E covered by the spine.

If the cut-off dose COD is calculated in the conventional way, the measured accumulated doses of the sub-chambers A, . . . , E of the first group are summed up. As the accumulated doses measured by the sub-chambers A, D not covered by the spine increases much faster than that measured by the other sub-chambers B, C, E, the influence of the not covered sub-chambers A, B onto the final summed accumulated dose is much higher than the influence of the other sub-chambers B, C, E. This causes, that the cut-off dose COD is finally reached too fast and the image quality in the area of the spine is not good enough in the conventional setting.

Figure 4:
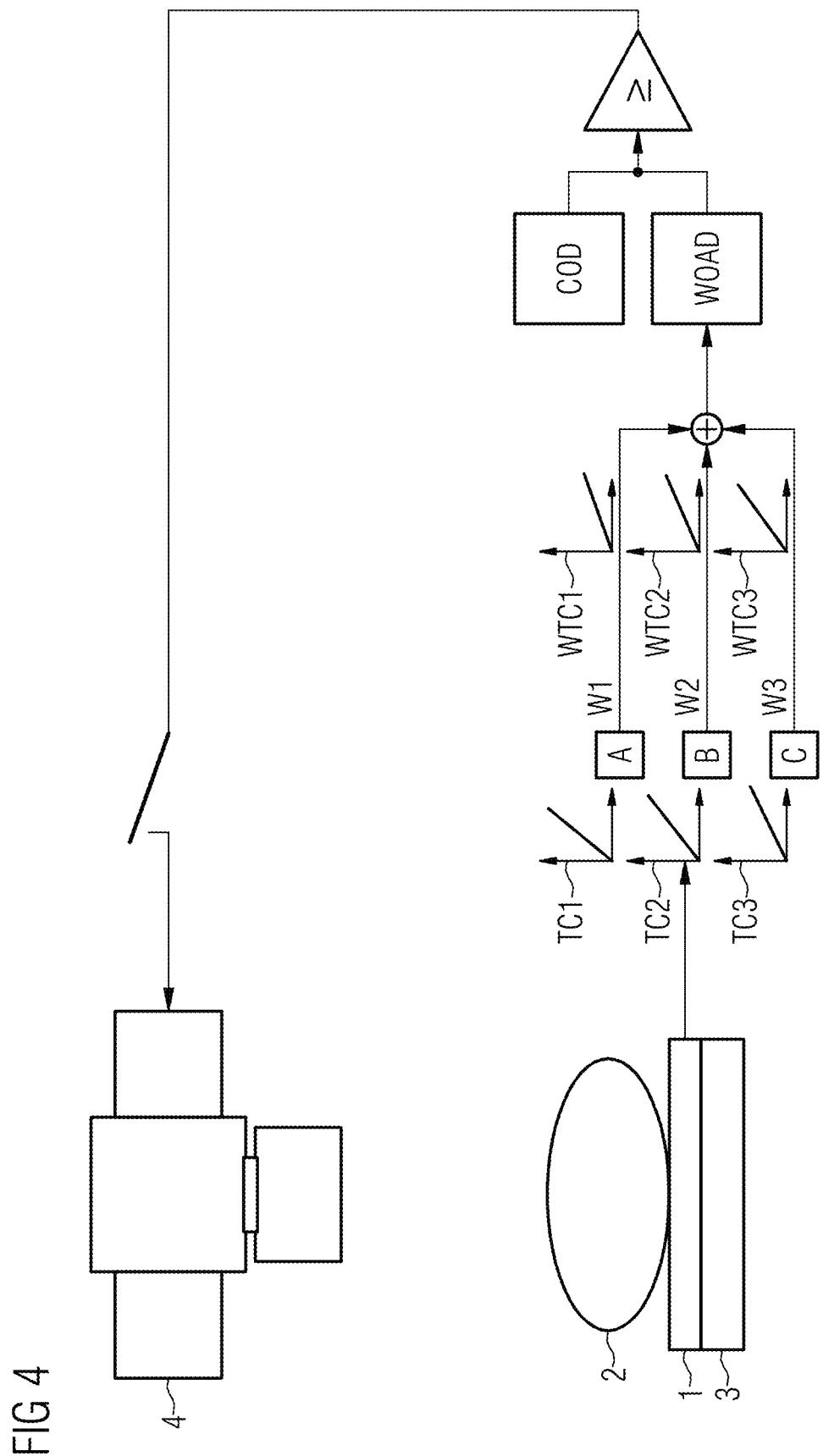

FIG. 4 displays a flow chart of a second embodiment of the method for dose control.

The method is performed in accordance with the description related to FIG. 1.

It is schematically depicted that a patient 2 is placed between a source 4, emitting x-rays, and a detector 3 detecting the x-rays passing respectively penetrating the patient 2. In front of the detector 3 the AEC 1 is positioned.

Exemplarily, three time-courses TC1, TC2, TC3 measured by three sub-chambers A, B, C of the AEC 1 are shown. The three time-courses TC1, TC2, TC3 show different slopes over time. With other words, the accumulated doses measured with the three sub-chambers increases differently with the time, in dependence of the material of the patient positioned in front of the respective sub-chamber A, B, C. Thus, the three time-courses TC1, TC2, TC3 have different gradients. The three time courses TC1, TC2, TC3 are received in the step of receiving REC-1, REC-2.

In dependence of the respective gradients of the time-courses TC1, TC2, TC3 for each sub-chamber A, B, C a weight W1, W2, W3 is determined in the step of determining DET-1, DET-2. Possible dependencies between the weights W1, W2, W3 and the time-courses TC1, TC2, TC3 are described in the description related to FIG. 1.

Each time-course TC1, TC2, TC3 is then multiplied with the corresponding weight W1, W2, W3 in the steps of multiplying MULT1, MULT2. As described above, each time-course TC1, TC2, TC3 comprises at least two values for the accumulated dose measured at two different points in time by the respective sub-chamber A, B, C. At least the latest value of each time-course TC1, TC2, TC3 is multiplied with the respective weight W1, W2, W3. Thereby, three weighted accumulated doses are determined, one for each sub-chamber A, B, C. The weighted accumulated dose of one sub-chamber A, B, C corresponds to the latest value of the respective time-course TC1, TC2, TC3 multiplied with the corresponding weight W1, W2, W3. The latest value of the time-course TC1, TC2, TC3 is the value which is measured last with the respective sub-chamber A, B, C.

The weighted accumulated doses are added in the step of adding ADD. Thereby, the weighted overall applied dose WOAD is determined.

This weighted overall applied dose WOAD is compared in the step of comparing COMP with the predetermined cut-off dose COD which has been received in the step of receiving REC-3.

If the weighted overall applied dose WOAD is smaller than the cut-off dose COD the method steps are repeated. Thereby a new, current weighted accumulated dose for each sub-chamber A, B, C is determined, which are summed up to a new, current weighted overall applied dose WOAD.

If the weighted overall applied dose equals WOAD and/or exceeds the cut-off dose COD, the result of the comparison is provided such that the source 4 is stopped in the step of stopping STOP emitting the radiation. For that purpose, the result is provided to the source 4 and/or to a controller of the source 4 in the step of providing PROV.

Figure 5:
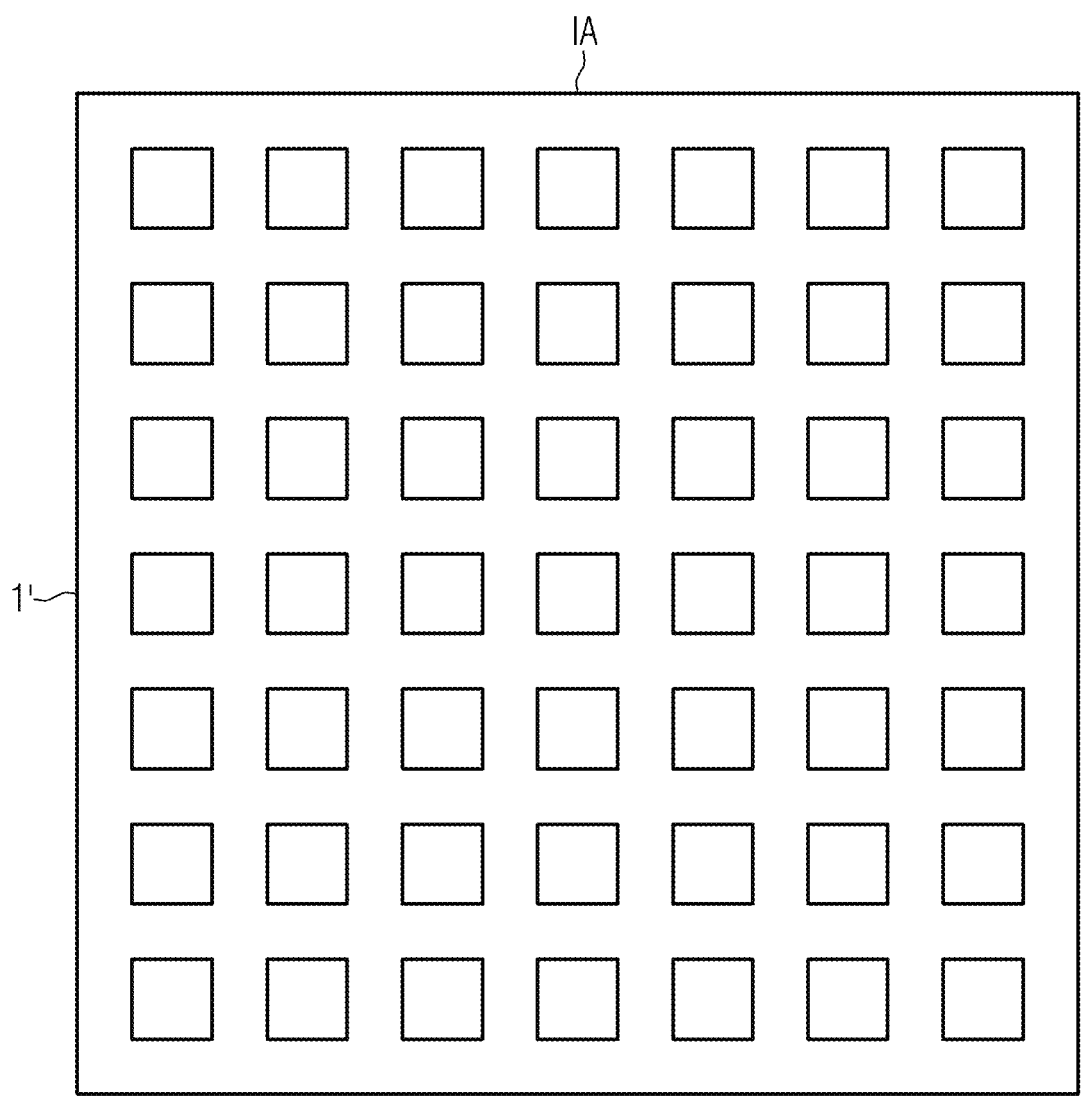

FIG. 5 displays a first embodiment of an AEC 1.

The AEC 1 comprises a number of sub-chambers which are distributed of the whole area of the AEC 1.

Advantageously the area of the AEC 1 corresponds to an imaging area of the detector 3. With other words, advantageously, the area of the AEC 1 covers the whole imaging area of the detector 3.

Figure 6:
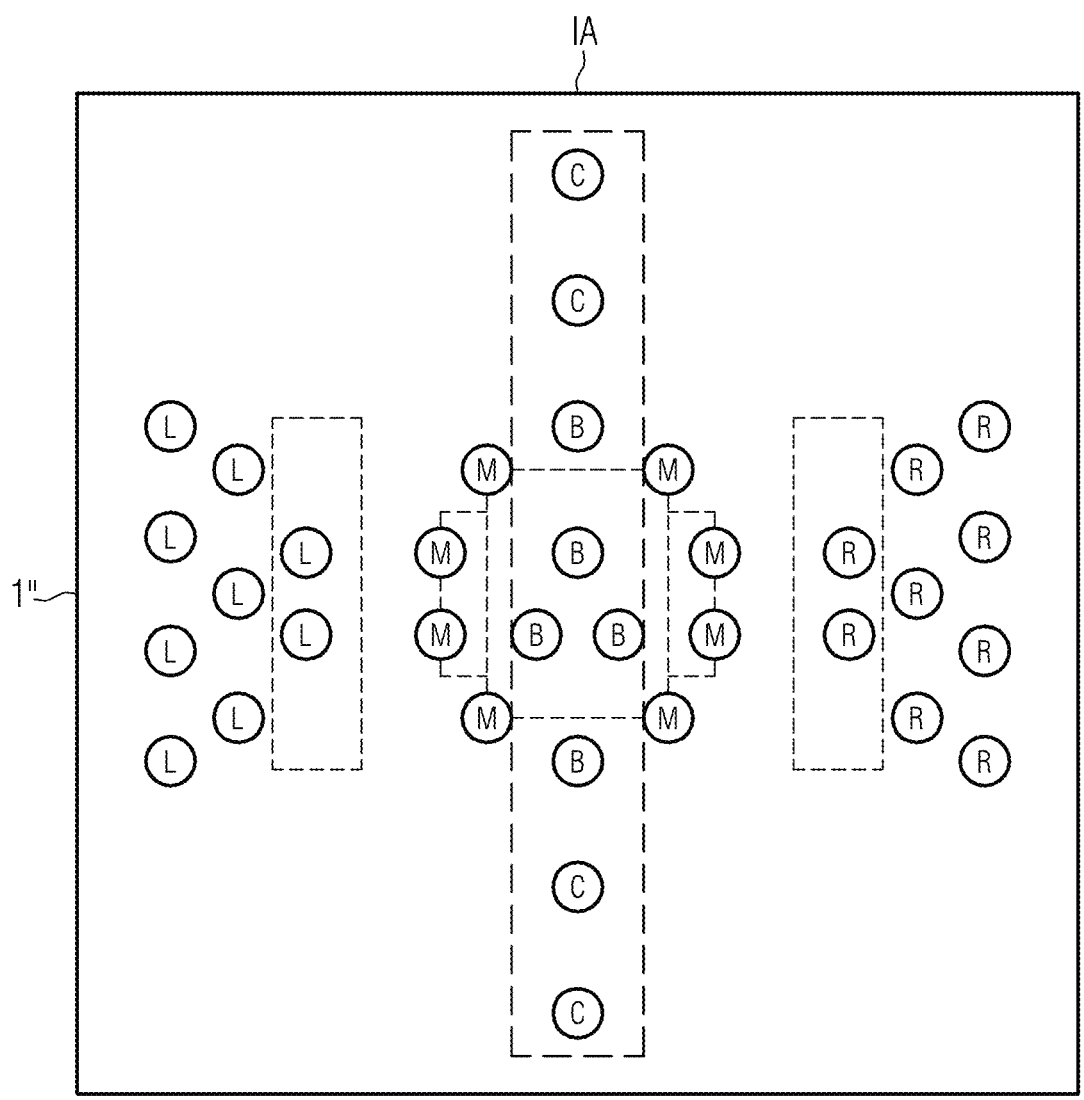

FIG. 6 displays a second embodiment of an AEC 1.

The AEC 1 comprises a number of sub-chambers. Compared to the state-of the art AEC 1 displayed in FIG. 2, the embodiment of the AEC 1 comprises more sub-chambers which are more widely spread over the area of the AEC 1.

Advantageously the area of the AEC 1 corresponds to an imaging area of the detector 3. With other words, advantageously, the area of the AEC 1 covers the whole imaging area of the detector 3.

In particular, a group of sub-chambers of the AEC 1 comprises more sub-chambers than known in the art. Alternatively or additionally, the AEC 1 comprises more groups of sub-chambers than known in the art.

Figure 7:
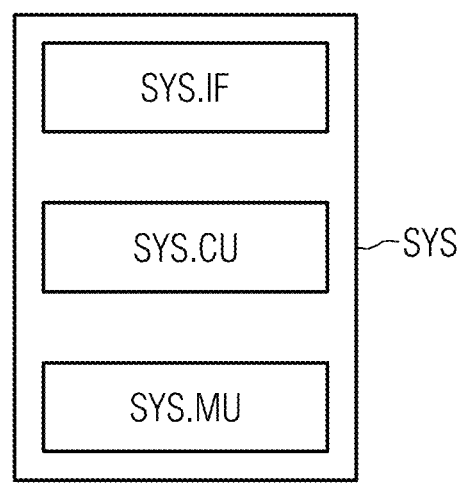

FIG. 7 displays a system SYS. The displayed system SYS is configured to execute a method according to one or more example embodiments for dose control. The system SYS comprises an interface SYS.IF, a computation unit SYS.CU, and a memory unit SYS. MU.

The system SYS can in particular be a computer, a microcontroller or an integrated circuit. Alternatively, the system SYS can be a real or a virtual network of computers (a technical term for a real network is "cluster", a technical term for a virtual network is "cloud"). The system SYS can also be designed as virtual system that is executed on a computer, a real network of computers or a virtual network of computers (a technical term is "virtualization").

An interface SYS. IF can be a hardware or software interface (for example PCI bus, USB or Firewire). A computation unit SYS.CU can have hardware elements or software elements, for example a microprocessor or a so-called FPGA (acronym for "field programmable gate way"). A memory unit SYS.MU can be implemented as a non-permanent working memory (random access memory, RAM for short) or as a permanent mass storage device (hard disk, USB stick, SD card, solid state disk).

The interface SYS. IF can in particular comprise a plurality of sub-interfaces which carry out different steps of the respective method. In other words, the interface SYS.IF can also be understood as a plurality of interfaces SYS.IF. The computation unit SYS.CU can in particular comprise a plurality of sub-computing units which carry out different steps of the respective method. In other words, the computation unit SYS.CU can also be understood as a plurality of computation units SYS.CU.

Wherever not already described explicitly, individual embodiments, or their individual aspects and features, can be combined or exchanged with one another without limiting or widening the scope of the described invention, whenever such a combination or exchange is meaningful and in the sense of this invention. Advantages which are described with respect to one embodiment of the present invention are, wherever applicable, also advantageous of other embodiments of the present invention.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system or memories registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a input/output system (BIOS) that basic interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from including languages C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The invention claimed is:

1. A computer-implemented method for dose control with an automatic exposure control, the automatic exposure control including at least a first sub-chamber and a second sub-chamber, and the method comprising:
applying radiation to the first sub-chamber and the second sub-chamber;
receiving a first time-course of a first accumulated dose from the first sub-chamber;
receiving a second time-course of a second accumulated dose from the second sub-chamber;
receiving a predetermined cut-off dose;
determining a first weight based on the first time-course;
determining a second weight based on the second time-course;
multiplying a latest value of the first time-course with the first weight to determine a first weighted accumulated dose;
multiplying a latest value of the second time-course with the second weight to determine a second weighted accumulated dose;

adding the first weighted accumulated dose and the second weighted accumulated dose to determine a weighted overall applied dose;
comparing the weighted overall applied dose with the predetermined cut-off dose to obtain a comparison result; and
performing at least one of,
providing a warning via a user interface based on the weighted overall applied dose equaling or exceeding the predetermined cut-off dose, or
stopping the applying the radiation based on the weighted overall applied dose equaling or exceeding the predetermined cut-off dose.

2. The method of claim 1, wherein the performing includes the stopping the applying the radiation based on the weighted overall applied dose equaling or exceeding the predetermined cut-off dose.

3. The method of claim 1, wherein at least one of:
the first time-course is associated with a first gradient, the determining the first weight including determining the first weight based on the first gradient; or
the second time-course is associated with a second gradient, the determining the second weight including determining the second weight based on the second gradient.

4. The method of claim 3, wherein at least one of:
the first weight is anti-proportional to the first gradient; or
the second weight is anti-proportional to the second gradient.

5. The method of claim 3, wherein
at least one of:
the determining the first weight determines the first weight,
to have a first value based on the first gradient being below a predetermined threshold, or
to have a second value based on the first gradient being above the predetermined threshold, or
the determining the second weight determines the second weight,
to have the first value based on the second gradient being below the predetermined threshold, or
to have the second value based on the second gradient being above the predetermined threshold; and
the first value is larger than the second value.

6. The method of claim 1, further comprising:
repeating the method while the weighted overall applied dose equals or exceeds the predetermined cut-off dose.

7. An automatic exposure control comprising:
at least a first sub-chamber and a second sub-chamber,
wherein the automatic exposure control is configured to perform the method of claim 1.

8. The automatic exposure control of claim 7, wherein a number of sub-chambers are distributed over an area which corresponds to an imaging area of a detector, the number of sub-chambers including the first sub-chamber and the second sub-chamber.

9. The automatic exposure control of claim 8, wherein the number of sub-chambers are equally distributed over the imaging area.

10. A system for dose control comprising:
the automatic exposure control of claim 7;
an interface; and
a computation unit, at least one of the interface or the computation unit being configured to cause the system to:
receive the first time-course of the first accumulated dose from the first sub-chamber,
receive the second time-course of the second accumulated dose from the second sub-chamber,
receive the predetermined cut-off dose,
determine the first weight based on the first time-course,
determine the second weight based on the second time-course,
multiply the latest value of the first time-course with the first weight to determine the first weighted accumulated dose,
multiply the latest value of the second time-course with the second weight to determine the second weighted accumulated dose,
add the first weighted accumulated dose and the second weighted accumulated dose to determine the weighted overall applied dose,
compare the weighted overall applied dose with the predetermined cut-off dose to obtain the comparison result, and
provide the comparison result.

11. A non-transitory computer program product comprising program elements that, when executed by a system, causes the system to perform the method of claim 1.

12. A non-transitory computer-readable storage medium comprising program elements that, when executed by a system, causes the system to perform the method of claim 1.

13. The method of claim 2, wherein at least one of:
the first time-course is associated with a first gradient, the determining the first weight including determining the first weight based on the first gradient; or
the second time-course is associated with a second gradient, the determining the second weight including determining the second weight based on the second gradient.

14. The method of claim 13, wherein at least one of:
the first weight is anti-proportional to the first gradient; or
the second weight is anti-proportional to the second gradient.

15. The method of claim 2, further comprising:
repeating the method while the weighted overall applied dose equals or exceeds the predetermined cut-off dose.

16. The method of claim 1, wherein the performing includes the providing a warning via a user interface based on the weighted overall applied dose equaling or exceeding the predetermined cut-off dose.

17. The method of claim 1, wherein the performing includes both of:
the providing a warning via a user interface based on the weighted overall applied dose equaling or exceeding the predetermined cut-off dose; and
the stopping the applying the radiation based on the weighted overall applied dose equaling or exceeding the predetermined cut-off dose.

18. The method of claim 16, wherein at least one of:
the first time-course is associated with a first gradient, the determining the first weight including determining the first weight based on the first gradient; or
the second time-course is associated with a second gradient, the determining the second weight including determining the second weight based on the second gradient.

19. The method of claim 18, wherein at least one of:
the first weight is anti-proportional to the first gradient; or
the second weight is anti-proportional to the second gradient.

20. The method of claim 16, further comprising:
repeating the method while the weighted overall applied dose equals or exceeds the predetermined cut-off dose.

\* \* \* \* \*